S. LYONS.
SPRING BRAKE AND AUTOMATIC STARTER.
APPLICATION FILED FEB. 12, 1912.
1,059,377.
Patented Apr. 22, 1913.
2 SHEETS—SHEET 2.
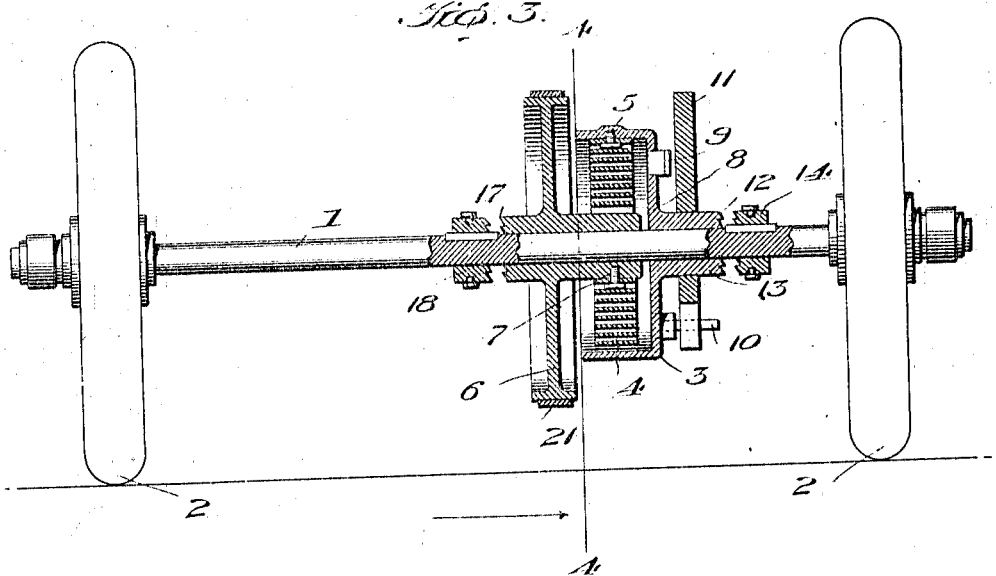
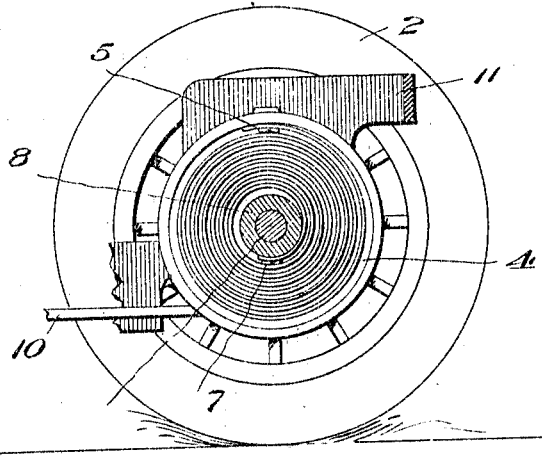

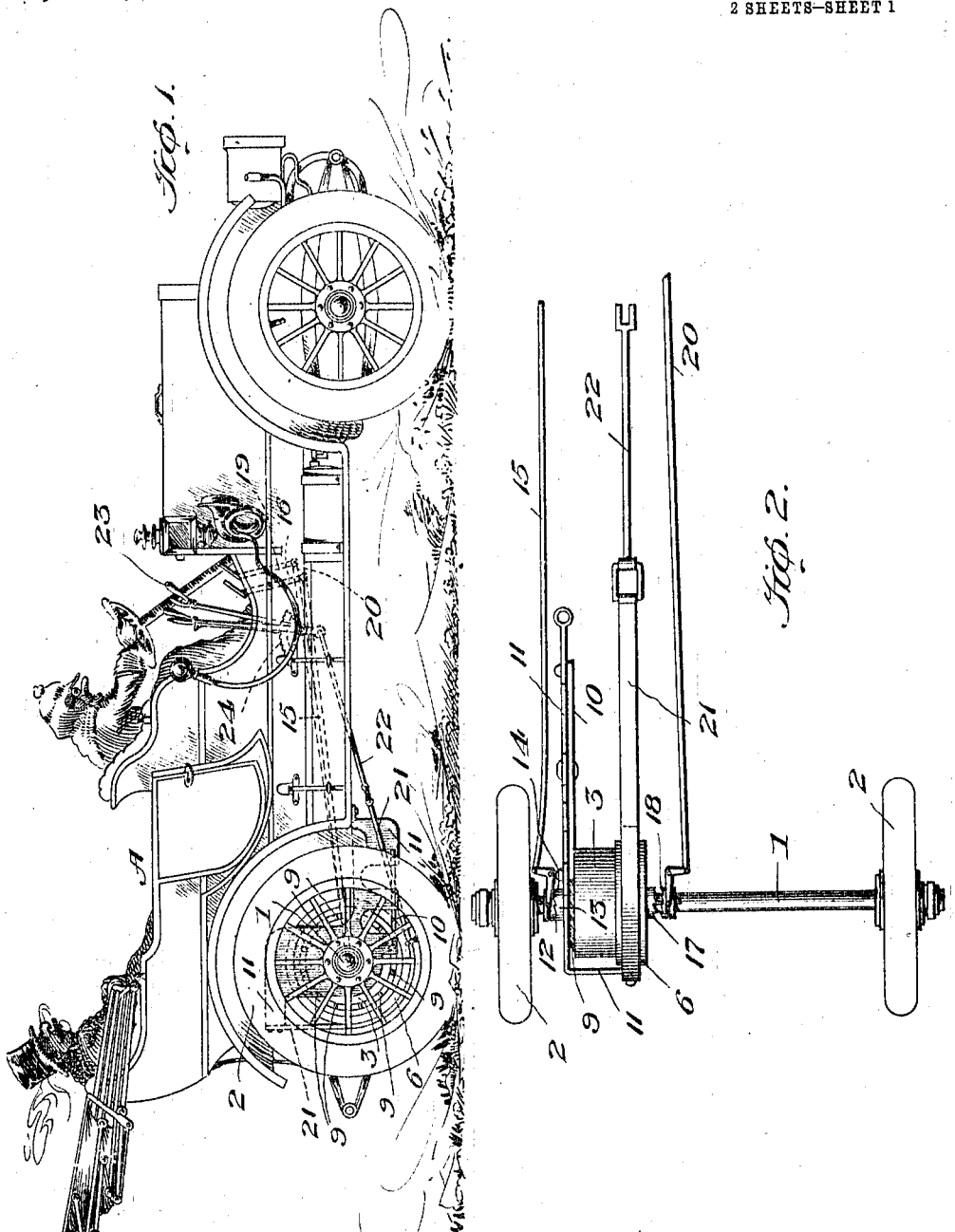

UNITED STATES PATENT OFFICE.

SIDNEY LYONS, OF OKLAHOMA, OKLAHOMA.

SPRING-BRAKE AND AUTOMATIC STARTER.

1,059,377.

Specification of Letters Patent.   Patented Apr. 22, 1913.

Application filed February 12, 1912.   Serial No. 677,146.

*To all whom it may concern:*

Be it known that I, SIDNEY LYONS, a citizen of the United States, residing at Oklahoma city, in county of Oklahoma and State of Oklahoma, have invented certain new and useful Improvements in Spring-Brakes and Automatic Starters, of which the following is a specification.

My invention relates to an improvement in spring brakes and automatic starters and the object is to provide a mechanism in which the power used in the braking operation is stored up and subsequently used for the starting operation.

This invention relates to certain novel features of construction and combinations of parts which will be hereinafter described and pointed out in the claims.

In the accompanying drawings:—Figure 1 is a view in side elevation showing the invention applied to an automobile; Fig. 2 is a bottom plan view of the device; Fig. 3 is a transverse, vertical sectional view; and Fig. 4 is a section on the line 4—4 of Fig. 3 in the direction of the arrow.

A, is the body of an automobile which is supported by the usual springs on the rear axle 1, on which are the wheels 2. A spring casing 3 is loosely fitted on the axle and a coil spring 4 is mounted in the casing and connected at its outer extremity as at 5. A brake drum 6 is mounted on the shaft adjacent to the spring casing. The drum is also loosely mounted and has the inner extremity 7 of the coil spring connected with its hub 8. The outer face of the spring casing has ratchet teeth 9 formed thereon and a spring dog 10 is mounted upon a suitable framework 11, in position to engage the teeth. A clutch face 12 is formed on the hub 13 of the casing and a clutch 14 is slidably keyed upon the shaft in position to engage the clutch face 12 and has a link 15 connecting it with the foot lever 16 in position to be operated by the operator. An obverse clutch face 17 is formed on the outer end of the hub 8 and an obverse clutch 18 is slidably keyed to the shaft in a position to be brought into engagement therewith. A foot lever 19 similar to the lever 16 is connected to the obverse clutch by a link 20 for operating it. A friction brake band 21 is connected in a suitable manner with the frame 11 and is received around the brake drum 6 to bear frictionally thereon. A link 22 extending forward from the brake band connects it with the hand lever 23 placed on the side of the car or in any convenient position, and a segment 24 is provided for locking the hand lever.

Assuming the parts to be connected as shown in Fig. 1, the operation is as follows: If the operator desires to stop the car he throws the clutch 14 into operative position through the link 15 and foot lever 16 which locks the spring casing 3 to the axle causing it to turn with the wheels and carry the brake drum 6 therewith through its connection by the coil spring 4. The hand lever 23 is then shifted to bring the brake band 21 to bear frictionally upon the brake drum 6 which causes the coil spring 4 to be wound around the hub 8 of the drum and as the friction of the brake band upon the drum increases, the spring is wound that much faster until the momentum of the car is overcome and it comes to a halt. The hand lever 23 is then locked in a segment 24 which leaves the spring tightly coiled. When it is desired to start the car the clutch 14 is thrown out of operative relation and the obverse clutch 18 is thrown into operative position through the link 20 and foot lever 19. Hand lever 23 is then shifted to release the brake band gradually from its frictional contact with the drum 6 which permits the coil spring 4 to unwind and carry the drum with it which in turn revolves the axle through the connection of the obverse clutch 18. The device can also be used to assist in going up grade. When the device is used in this manner the brake band 21 is tightened sufficiently on the down grade to cause the spring 4 to be tightly coiled within the casing 3 and at the beginning of the up grade is released to permit the spring to uncoil and thus exert its force in a forward direction upon the axle. The device might also be used in other connections as, for instance, with street cars or any heavy vehicle in which it is difficult when starting to overcome the inertia with the normal driving power, and might also be applied to start an explosive engine or other heavy machinery with equally good results.

It will thus be seen that I have provided a device of the character named which is simple in manufacture and operation and which may be readily applied to existing structures without a material departure from the present design.

Having fully described my invention, what I claim as new and desire to secure by Letters Patent, is:—

1. In a device of the character named the combination with a car body a brake drum, an axle on which the drum is revolubly mounted, a spring casing mounted on the axle, a frame connected to the car body, means connecting the casing to the frame for preventing the casing revolving but in one direction, a spring received within and connected with the casing and drum, a clutch slidably keyed on the axle in a position to engage with a clutch face on the casing, an obverse clutch slidably received upon the axle in a position to engage with an obverse clutch face on the drum, a brake band mounted to frictionally engage the brake drum, and means whereby the clutch, the brake band and the obverse clutch may each be operated independently of the other.

2. In a device of the character named the combination with a car body a brake drum, an axle on which the brake drum is revolubly mounted, a spring casing mounted on the axle adjacent the drum, teeth on the casing, a frame connected to the car body, a dog on the frame engaging the teeth of the casing for holding the casing against rotation but in one direction, a coil spring received within the casing and around the hub of the drum, said spring connected with the drum at its inner end and with the casing at its outer end, a clutch on the axle in position to engage the casing, a brake band mounted to bear against the brake drum, an obverse clutch received upon the axle in a position to engage the drum, and means for operating the brake band and clutches independently of each other.

In testimony whereof I affix my signature, in the presence of two witnesses.

SIDNEY LYONS.

Witnesses:
 PAL TYE,
 R. D. GUY.